Feb. 12, 1963
J. B. OSBORNE
3,077,447
CONVERSION PROCESS AND APPARATUS FOR USE THEREIN
Filed Feb. 1, 1956
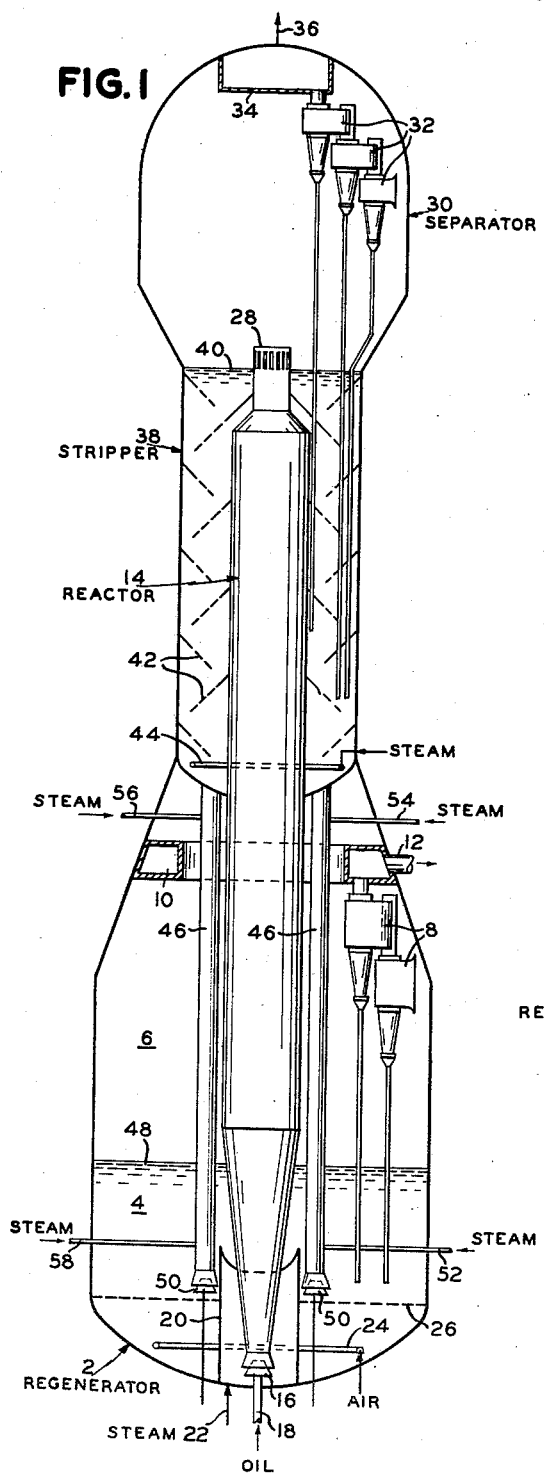
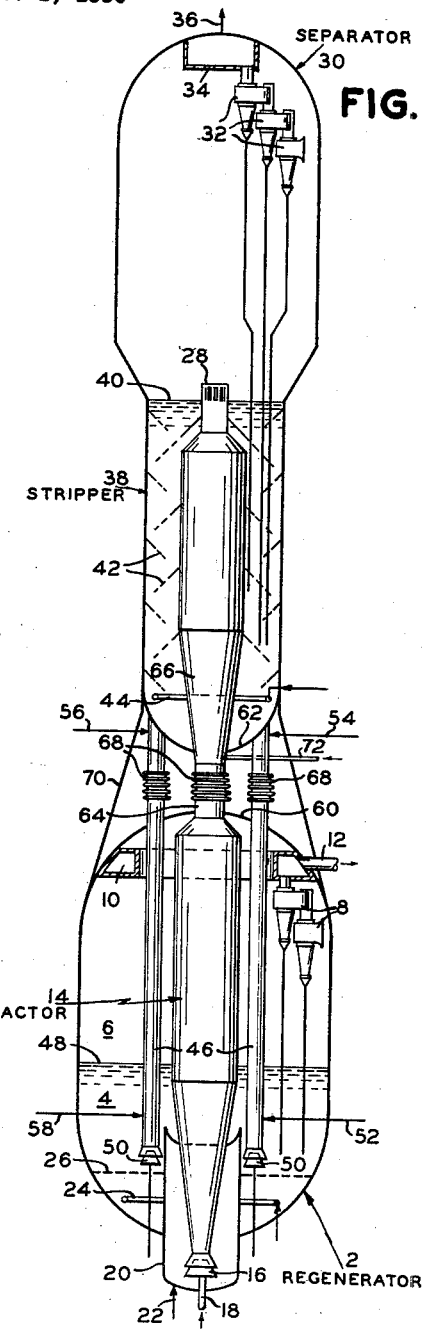
*INVENTOR.*
JOHN B. OSBORNE
BY
*D. H. Palmer*
*James E. Bryan*
ATTORNEYS

United States Patent Office 3,077,447
Patented Feb. 12, 1963

3,077,447
CONVERSION PROCESS AND APPARATUS
FOR USE THEREIN
John B. Osborne, South Orange, N.J., assignor to The
M. W. Kellogg Company, Jersey City, N.J., a corporation of Delaware
Filed Feb. 1, 1956, Ser. No. 562,743
11 Claims. (Cl. 208—74)

This invention relates to an improved process and apparatus for converting hydrocarbons and more particularly it relates to a process and apparatus for catalytically cracking high boiling hydrocarbons to gasoline of high anti-knock quality.

In accordance with the present invention, a process is provided in which a vaporous hydrocarbon is contacted with a finely divided catalytic material under suitable conversion conditions in a concurrent flow reaction zone thereby producing a reaction product and contaminating the catalyst with carbonaceous material and volatile hydrocarbons. The mixture of contaminated catalyst and vaporous product is discharged from the concurrent flow reactor into a catalyst separation zone in which the vaporous products separate from the catalytic material and pass out of the converter through suitable separation equipment, such as cyclones or the like, and the contaminated catalyst is passed downwardly through a stripping zone as a dense mass in countercurrent contact with a gasiform stripping agent, whereby volatile hydrocarbon materials are stripped from the contaminated catalyst.

The stripping zone is an annular chamber surrounding the upper portion of the reactor and may be provided with suitable baffles, if desired. From the stripping zone, the stripped catalyst is transferred to a regenerator, mounted below the stripping zone and being in the form of an annular vessel surrounding the lower portion of the concurrent flow reactor. The stripped catalyst is transferred from the catalyst stripper into the regenerator through one or more standpipes, which extend from the lower portion of the catalyst stripper to a point below the surface of the dense phase in the regenerator, the flow through the standpipes being regulated by suitable plug valves of conventional type.

The present invention is particularly applicable to the catalytic cracking of high boiling hydrocarbons such as residual oils, heavy distillates, gas oils and the like, using a suitable cracking catalyst. The catalyst may be a siliceous material containing about 70 to 99 percent of silica, and the remainder can be one or more of other suitable materials such as alumina, boria, magnesia, zirconia and the like. The cracking reaction is effected at a temperature of about 800 to 1025° F., preferably about 850 to 975° F. The operating pressure in the concurrent flow reactor may be in the range of about 1 atmosphere to about 50 p.s.i.g., preferably about 5 to 25 p.s.i.g. The weight space velocity, measured as pounds of oil charged to the concurrent flow reactor per pound of catalyst present therein, is about 1 to about 50, preferably about 5 to 20. The catalyst to oil ratio on a weight basis may vary from about 2 to 20 and preferably about 5 to 10 as it is desired to utilize the heat of combustion in the regeneration zone for the endothermic cracking reactions and to maintain a desired level of catalyst activity in the cracking zone.

The catalyst-vapor mixture is passed upwardly through the concurrent flow reactor at a velocity in the range of about 4 to 20 feet per second, and ordinarily, this velocity is in the range of about 6 to 15 feet per second, the catalyst-vapor mixture having a density in the range of about 5 to 25 pounds per cubic foot.

The catalyst-vapor mixture is discharged from the concurrent flow reactor through a slotted distributor, or other suitable means, into a catalyst separation chamber forming the top of the converter. The temperatures in the catalyst separator may be in the same range as those in the reactor but the operating pressure is generally slightly less, i.e. it is decreased an amount equivalent to the static head and flow resistance imposed by the catalyst in the reactor and the stripper. The cracked vapors pass out of the catalyst separator to suitable fractionating equipment, through one or more stages of cyclones, and the dense phase of contaminated catalyst passes downwardly through the annular stripping chamber.

The spent catalyst is stripped at a temperature which may be in the same range as the reaction temperature but which can vary therefrom by using a gasiform stripping agent having a higher or lower temperature. The gasiform stripping agent can be steam, recycle gas or a normally gaseous hydrocarbon and the like.

The stripped catalyst transferred to the regenerator is regenerated by burning the carbonaceous deposits from the catalyst, using an oxygen containing gas such as air, at a temperature of about 750 to 1200° F. preferably about 950 to 1150° F. and at a pressure in the range of about 1 atmosphere to 50 p.s.i.g.

Since the converter of the present invention utilizes a concurrent flow reactor, the reactor is of reduced cross-sectional area and is elongated in shape, compared to the regenerator. Generally speaking, in the apparatus of the present invention, the regenerator contains about 1 to 20 times as much catalyst on a weight basis as does the reactor, preferably about 2 to 10 times as much on the same basis.

The apparatus of this invention is provided with means for the withdrawal of regenerated catalyst from a low point in the regeneration zone and accordingly, a well is provided around the hollow stem plug valve, through which the vaporous feed is injected. The well provides a chamber into which aeration steam may be passed, the steam also serving to strip any occluded products of combustion from the regenerated catalyst.

The apparatus of the present invention provides for substantially straight line catalyst flow since the catalyst passes vertically through the concurrent flow reactor and downwardly through the stripping zone and the standpipes connecting the stripping zone with the regeneration zone. This arrangement provides better circulation of catalyst particles within the converter and also eliminates the erosion resulting from the use of U bends in side-by-side units.

Referring to the accompanying drawings in which two embodiments of the present invention are shown, FIGURE 1 is a diagrammatic illustration of apparatus in elevation showing one form of the converter of the present invention constructed with a common head between the stripping zone and the regeneration zone, and FIGURE 2 is a diagrammatic illustration similar to that of FIGURE 1 showing a construction using separate heads between the stripping zone and the regeneration zone.

Referring to FIGURE 1 of the drawings, the apparatus includes a regenerator vessel 2 having a dense phase of catalyst 4 therein and a dilute phase 6. Mounted in the upper portion of the regenerator are two stages of cyclones 8 which discharge into the flue gas header 10 which is connected to the flue gas outlet 12.

Centrally located in the regenerator is the concurrent flow reactor 14 being provided at the lower end thereof with the hollow stem plug or injector valve 16 having the oil inlet line 18 connected thereto. A well 20 is provided around the lower portion of the concurrent flow reactor and the injector valve, to prevent spent catalyst from entering into the reactor, and an aeration steam line 22 is provided in the lower portion of the well 20. A combustion air distributor 24 is also provided in the lower portion of the regenerator 2 below the foraminous plate or grid 26.

The catalyst entering the concurrent flow reactor through the hollow stem plug valve 16 is passed upwardly as a mixture with oil vapors introduced through the line 18 and a mixture of catalyst and products of reaction is discharged from the reactor through the slotted distribution vessel 28 into the catalyst separator 30 in which are shown three stages of cyclones 32. The cyclones discharge the cracked products into the plenum chamber 34 from which they are withdrawn through the line 36 and transferred to suitable fractionating equipment.

The spent catalyst discharged through the distributing vessel 28 forms a dense bed in the annular stripping chamber 38, the dense bed having the level 40. The spent catalyst passes downwardly through the stripping chamber 38 over a plurality of baffles 42, which in the embodiment shown may be four disc and five donut baffles equally spaced to provide approximately 40 percent of free area. The spent catalyst is countercurrently contacted with stripping steam, introduced through the ring 44 positioned in the bottom of the annular stripping zone. The stripped catalyst passes from the stripping zone as a dense phase through one or more standpipes 46 into the dense phase 4 in the regenerator below the level 48 thereof. The flow of stripped catalyst from the standpipes into the regenerator dense phase is controlled by the conventional plug valves 50. Suitable provision may be made for the introduction of aeration steam into the standpipes 46 through the lines 52, 54, 56 and 58.

Referring to FIGURE 2 of the drawing, a second embodiment of the invention is shown which is generally similar to that of FIGURE 1, except that the regenerator and stripping chamber are provided with separate heads. In this embodiment, the regenerator 2 has the head 60 and the bottom of the stripping chamber 38 is formed as a separate head 62. The reactor 14 is necked down at the point 64 where it passes between the regenerator and the stripping chamber and is also provided with a portion in the shape of a truncated cone 66 in the lower part of the stripping chamber. Suitable expansion joints 68 are provided in the concurrent flow reactor and in the catalyst standpipes 46 in the space between the regenerator and the catalyst stripper. The upper portion of the reactor, the catalyst separator and the stripper are supported by the frame 70, which is in the shape of a truncated cone, but which withstands no internal pressure. The other details of the operation of this embodiment are substantially identical with that of FIGURE 1 but, in the embodiment of FIGURE 2, the concurrent flow reactor is divided into two cracking zones as a result of the necked-down portion thereof containing the expansion joint. If desired, a second feed stream, which may be the same, or a different oil, as that introduced into the bottom of the reactor, may be fed to the reactor through the line 72 at a point above the expansion joint 68 in the necked-down portion of the reactor 64. In this manner, greater flexibility is achieved as the feed introduced through the injector valve at the bottom of the reactor can be subjected to severe cracking and the feed introduced into the upper cracking zone can be subjected to mild cracking conditions.

The invention will be further illustrated by reference to the following specific example which shows the operating conditions, suitable for use in the fluid catalytic cracking system of this invention, adapted to process 33,000 barrels per day of heavy gas oil, i.e. a feed having an A.P.I. gravity of 22°, coke=7.7 weight percent, at a throughput ratio of 1.67 and a fresh feed conversion of 65 percent.

EXAMPLE 1

Table I

Reactor:
Length, feet, including inlet cone _____ 132.
Diameter, feet _____ 9.
L/D ratio _____ 14.6.
Temperature, °F. _____ 915.
Space velocity _____ 7.4 lbs. total feed/hr./lb. of catalyst in reactor.
Catalyst:oil ratio _____ 12.5 on fresh feed, 7.5 on total feed.
Pressure, p.s.i.g. _____ 10 at outlet.
Density of catalyst-vapor mixture _____ 15 lbs./cu. ft.
Velocity of catalyst-vapor mixture _____ 12 ft./sec., average.
Reactor pressure drop, p.s.i. ___ 10.
Catalyst holdup in reactor ____ 60 tons.
Catalyst separator:
Length, feet (to cyclone inlet)_ 30.
Diameter, feet _____ 30.
L/D ratio _____ 1.0.
Temperature, °F. _____ 915.
Pressure, p.s.i.g. _____ 10.
Flow to cyclones _____ 1242 cu. ft./sec.
Cyclone inlet velocity _____ 60 ft./sec.
Spent catalyst stripper:
Length, feet _____ 40.
Diameter, feet _____ 20.
L/D ratio _____ 2.
Steam rate _____ 5 lbs. steam/1000 lbs. catalyst circulated.
Regenerator:
Length, feet (to cyclone inlet)_ 35.
Diameter, feet _____ 37.
L/D ratio _____ 0.95.
Temperature, °F. _____ 1100.
Pressure, p.s.i.g. _____ 21.1.
Catalyst density _____ 30 lbs./cu. ft.
Gas velocity _____ 2.04 ft./sec.
Catalyst holdup, tons _____ 235.
Transfer line system:
Standpipe catalyst density ____ 30 lbs./cu. ft.
Standpipe catalyst pressure head, p.s.i. _____ 11.2.
Standpipe catalyst velocity (average _____ 4.4 ft./sec.
Standpipe valve pressure drop, p.s.i. _____ 6.3.

It will be obvious to those skilled in the art that many modifications may be made within the scope of the present invention without departing from the spirit thereof, and the invention includes all such modifications.

I claim:
1. A unitary vessel comprising in combination a substantially vertical elongated open end riser conduit, a first chamber surrounding the lower portion of said open end conduit forming a first annular chamber therewith, a second chamber surrounding the upper portion of said open end conduit forming a second annular chamber in the lower portion of said second chamber, said second annular chamber being of smaller diameter than said first anular chamber and being provided with a plurality of alternately staggered, downwardly sloping, baffle members, at least one substantially vertical open end withdrawal conduit connecting the lower portion of said second annular chamber with the lower portion of said first annular chamber, a well positioned in the lower portion of said first chamber surrounding the lower open end of said riser conduit open at its upper end and extending above the bottom of said withdrawal conduit, a plug valve aligned with the bottom open end of said withdrawal conduit, a hollow stem plug valve aligned with the bottom open end of said riser conduit, means for adding a gaseous material to the lower portion of said first annular chamber, means for removing a gaseous product from the upper portion of said first chamber, means for adding a gaseous material to the lower portion of said second annular chamber, means for removing a gaseous product from the upper portion of said second chamber and means for passing a reactant material through said hollow stem plug valve.

2. An elongated substantially vertical vessel comprising in combination a first chamber, a second chamber positioned above said first chamber, an elongated reactor conduit open at its bottom end coaxially positioned within and extending from the lower portion of said first chamber into the upper portion of said second chamber, said elongated reactor conduit being of smaller diameter adjacent to its upper and lower ends than the intervening portion thereof, the upper end of said reactor conduit being capped and provided below said capped end with a plurality of elongated slots around the periphery thereof, said second chamber being of larger diameter in the upper portion thereof above the upper end of said reactor conduit than in the lower portion thereof, said first chamber being of larger diameter than said second chamber, a plurality of open end withdrawal conduits connecting the lower portion of said second chamber with the lower portion of said first chamber, a well open at its upper end surrounding the lower portion of said reactor conduit and extending above the bottom of said withdrawal conduits, means for adding a gaseous material to the lower portion of said first chamber, means for introducing a reactant material to the bottom of said open end conduit, means for adding a gaseous material to the lower portion of said second chamber and means for removing a gaseous material from the upper portion of said first and second chamber.

3. A substantially vertical vessel comprising in combination a first regeneration chamber, a second chamber coaxially positioned with and above said first chamber, a third enlarged separation chamber in open communication with and coaxially positioned above said second chamber, said second chamber separated from said first chamber by a baffle member, an elongated open end conduit positioned within and extending from the lower portion of said first chamber upwardly through said second chamber thereby forming an annular stripping chamber in said second chamber, a plurality of downwardly sloping baffle members positioned within said annular stripping chamber, a plurality of open end conduits connecting the lower portion of said stripping chamber with the lower portion of said first chamber, means for introducing a gaseous material to the lower portion of said first chamber, means for introducing a reactant material to the bottom open end of said elongated reactor conduit, means for separately adding reactant material to an intermediate point of said reactor conduit, means for adding a gaseous material to the lower portion of said stripping chamber, and means for removing a gaseous material from the top of said third chamber.

4. An improved method for converting hydrocarbons in a transfer line cracking zone which comprises passing a mixture of fresh hydrocarbon feed material and finely divided catalyst as a concurrent suspension upwardly through an elongated confined cracking zone at a velocity in the range of from about 4 to about 20 feet per second under severe cracking conditions in the lower portion of the cracking zone and less severe cracking conditions in the upper portion of said cracking zone, separately introducing a cycle oil to the upflowing mixture entering the upper portion of the cracking zone under less severe cracking conditions, discharging products of said cracking reactions and catalyst from the top of said cracking zone, separating reaction products from catalyst, stripping the separated catalyst, regenerating the stripped catalyst and passing the regenerated catalyst at an elevated temperature to said severe cracking portion of the cracking zone.

5. A unitary vessel comprising in combination a substantially vertical elongated open end riser conduit, a first chamber surrounding the lower portion of said open end conduit forming a first annular regeneration chamber therewith, a second chamber surrounding the upper portion of said open end conduit forming an annular stripping chamber in the lower portion thereof and a disengaging chamber in the upper portion of said second chamber, said annular stripping chamber being of smaller diameter than said first annular chamber, at least one substantially vertical open end withdrawal conduit connecting the lower portion of said annular stripping chamber with the lower portion of said first annular chamber, a well positioned in the lower portion of said first chamber surrounding the lower open end of said riser conduit open at its upper end and extending above the bottom of said withdrawal conduit, a plug valve aligned with the bottom open end of said withdrawal conduit, a hollow stem plug valve aligned with the bottom open end of said riser conduit, a perforated grid means positioned across the lower cross-section of said first annular chamber and below the bottom of said withdrawal conduit, means for adding a gaseous material to the lower portion of said first annular chamber beneath said grid means, means for removing a gaseous product from the upper portion of said first chamber, means for adding a gaseous material to the lower portion of said second annular chamber, means for removing a gaseous product from the upper portion of said second chamber, means for passing a reactant material through said hollow stem plug valve, means for passing additional reactant to an intermediate part of said riser conduit, and means for adding a gaseous material to the upper and lower portion of said withdrawal conduit.

6. A unitary vessel comprising in combination a substantially vertical elongated open end riser conduit of smaller diameter in the intermediate portion thereof, a first chamber surrounding the lower portion of said open end conduit forming a first annular chamber therewith, a second chamber surrounding the upper portion of said open end conduit forming a second annular chamber in the lower portion thereof with a disengaging chamber above said open end conduit of larger diameter than said second annular chamber, said disengaging chamber being of smaller diameter than said first annular chamber, said second annular chamber provided with a plurality of baffle members to provide a tortuous path for downwardly flowing finely divided contact material therein, at least one substantially vertical open end withdrawal conduit connecting the bottom of said second annular chamber with the lower portion of said first annular chamber and terminating above a perforated grid positioned across the cross section thereof, a well positioned in the lower portion of said first chamber surrounding the lower open end of said riser conduit open at its upper end and extending above the bottom of said withdrawal conduit, a plug valve aligned with the bottom open end of said withdrawal conduit, a hollow stem plug valve aligned with the bottom open end of said riser conduit, means for adding a gaseous material to the lower portion of said first annular chamber, means for removing a gaseous product from the upper portion of said first chamber, means for adding a gaseous material to the lower portion of said second annular chamber, means for removing a gaseous product from the upper portion of said second chamber, means for passing a reactant material through said hollow stem plug valve and means for introducing reactant material to the intermediate portion of said riser of smaller diameter.

7. A catalytic cracking process which comprises passing a mixture of hydrocarbon and finely divided cracking catalyst upwardly through an elongated transfer line cracking zone as a concurrent suspension under severe cracking conditions in the lower portion of said transfer line cracking zone and less severe cracking conditions in the upper portion thereof to convert said hydrocarbon to desired products and thereby contaminate the catalyst, separately introducing additional hydrocarbon reactant to said upflowing mixture in an intermediate portion of said transfer line cracking zone maintained at a higher velocity than the major portion of said upflowing mixture, removing reaction products and contaminated catalyst from the top of the reaction zone and passing the same to a catalyst separation zone, separating finely divided catalyst from said reaction products in said separation zone and passing separated catalyst downwardly in a tortuous path through an elongated annular stripping zone countercurrent to stripping gas introduced to the lower portion thereof, stripping products of reaction from said catalyst in said stripping zone, recovering stripped products of reaction and reaction products from the upper portion of said separation zone, passing said stripped catalyst downwardly through at least one confined substantially vertical stream to the lower portion of a regeneration zone, contacting said contaminated catalyst in said regeneration zone with a combustible gas under conditions to maintain the catalyst in a dense fluidized phase condition whereby contaminants are removed from the catalyst by combustion, recovering regenerated catalyst from said regeneration zone and passing the same with additional hydrocarbon reactant upwardly through said transfer line reaction zone.

8. A unitary apparatus comprising in combination a lower regeneration chamber, an intermediate stripping chamber and an upper disengaging chamber in open communication with said stripping chamber, said disengaging chamber being of larger diameter than said stripping chamber and of smaller diameter than said regeneration chamber, a stripping well open at its upper end positioned in the lower portion of said regeneration chamber and extending upwardly into a fluidized bed of contact material maintained therein, a transfer line conduit coaxially positioned within said vessel extending from the lower portion of said well upwardly through said vessel to the lower portion of said disengaging chamber, said transfer line conduit being of smaller diameter at its ends and intermediate portion thereof than the intervening portion therebetween, said stripping chamber provided with a plurality of downwardly sloping baffle members, at least one standpipe extending from the bottom of said stripping chamber to the lower portion of said regeneration chamber and terminating below the open upper end of said stripping well, a distributor grid cross-sectionally positioned in the lower portion of said regeneration chamber and beneath the bottom of said standpipe, valve means for controlling the flow of contact material from the bottom of said standpipe, means for introducing gaseous material to said standpipe, means for introducing a gaseous material to the lower portion of said stripping chamber, means for introducing a gaseous material beneath the distributor grid in said regeneration chamber, means for introducing a reactant material to the bottom and intermediate portion of said transfer line conduit and means for removing a gaseous material from the upper portion of said regeneration chamber and said disengaging chamber.

9. A method for converting hydrocarbon reactant material in the presence of finely divided catalytic material which comprises passing catalyst through a plurality of sequentially connected upflow reaction zones at alternating high and low velocity conditions, introducing hydrocarbon reactant to said catalyst during the high velocity conditions of the catalyst under conditions to form a suspension and convert said hydrocarbon reactant to desired product, withdrawing catalyst and product from the last of said reaction zones and separating catalyst from products of reaction, stripping the separated catalyst of volatile reaction products as it moves continuously downwardly through an elongated annular stripping zone surrounding the last reaction zone in the series, recovering stripped products of reaction combined with separated products of reaction from said separation zone, withdrawing stripped catalyst from the bottom of the stripping zone and passing the withdrawn stripped catalyst as a continuous downwardly moving elongated confined aerated column of catalyst to the lower portion of a relatively dense fluidized bed of catalyst in a regeneration zone, regenerating catalyst in said regeneration zone with an oxygen-containing gas and passing regenerated catalyst to the first of said series of reaction zones.

10. A method for converting hydrocarbon reactant material in the presence of finely divided catalytic material which comprises passing a suspension of hot freshly regenerated catalyst continuously upwardly through an elongated reaction zone, introducing a first hydrocarbon reactant to contact with said catalyst suspension under conversion conditions to form a first high velocity mixture of catalyst and hydrocarbon reactant in a first reaction zone which gradually decreases in velocity in the direction of flow, thereafter passing the mixture through a second relatively high velocity zone to which a second hydrocarbon reactant is introduced to form a second mixture of catalyst and hydrocarbon reactant under conversion conditions which thereafter gradually decrease in velocity in the direction of flow through the second zone, passing the catalyst with all of the reaction products from the second zone into a separation zone to separate entrained catalyst from products of reaction, recovering said reaction products, stripping said separated catalyst in an annular zone surrounding the upper portion of said second reaction zone as a continuous downwardly moving stream of catalyst, passing the stripped catalyst continuously downward from the bottom of the stripping zone to the lower portion of a relatively dense fluidized bed of catalyst in a regeneration zone surrounding said first zone and regenerating catalyst at an elevated temperature in said regeneration zone.

11. A method for catalytically converting a hydrocarbon reactant stream in the presence of finely divided catalytic material, stripping the catalyst of reaction products and regenerating the catalyst which comprises passing a mixture of hydrocarbon reactant and finely divided catalyst upwardly as a suspension through an elongated confined reaction zone at a velocity in the range of from about 4 to about 20 feet per second, discharging products of reaction and finely divided catalyst from substantially the top of said elongated reaction zone at substantially the inlet to an elongated annular stripping zone which is in open communication with a separation zone thereabove, separating finely divided catalyst from said reaction products in said separation zone, passing the separated catalyst downwardly through said annular stripping zone in an elongated tortuous path whereby products of reaction are stripped from said catalyst by stripping gas introduced to substantially the bottom thereof, combining the stripped products of reaction with the reaction products separated in the separating zone, removing reaction products from the upper portion of said separation zone, recovering stripped catalyst from substantially the bottom portion of said stripping zone and passing the same substantially vertically downwardly through at least one relatively dense elongated confined stream to a dense fluidized bed of catalyst in a regeneration zone, said stripping zone being external to said regeneration zone and substantially out of indirect heat exchange with said regeneration zone, in said regeneration zone contacting the finely divided stripped catalyst in a dense fluidized condition with a regeneration gas, separating regenerated catalyst from the regeneration zone and mixing regenerated catalyst with additional hydrocarbon reactant for passage upwardly through said elongated confined reaction zone.

References Cited in the file of this patent

UNITED STATES PATENTS

| | | |
|---|---|---|
| 2,344,449 | Ogorzaly | Mar. 14, 1944 |
| 2,399,050 | Martin | Apr. 23, 1946 |
| 2,414,373 | Gerhold | Jan. 14, 1947 |
| 2,429,359 | Kassel | Oct. 21, 1947 |
| 2,458,356 | Evans | Jan. 4, 1949 |
| 2,459,824 | Leffer | Jan. 25, 1949 |
| 2,464,257 | Pelzer et al. | Mar. 15, 1949 |
| 2,486,229 | Utterback | Oct. 25, 1949 |
| 2,503,013 | Watson | Apr. 14, 1950 |
| 2,541,077 | Leffer | Feb. 13, 1951 |
| 2,606,097 | Goodson et al. | Aug. 5, 1952 |
| 2,629,684 | Leffer | Feb. 24, 1953 |
| 2,671,102 | Jewell | Mar. 2, 1954 |
| 2,672,407 | Leffer | Mar. 16, 1954 |
| 2,727,810 | Leffer | Dec. 20, 1955 |
| 2,785,110 | Leffer | Mar. 12, 1957 |